United States Patent
Yamaguchi et al.

(10) Patent No.: US 11,405,702 B2
(45) Date of Patent: Aug. 2, 2022

(54) OPTICAL SIGNAL PROCESSING DEVICE AND METHOD FOR CONTROLLING SAME

(71) Applicant: Nippon Telegraph and Telephone Corporation, Tokyo (JP)

(72) Inventors: Keita Yamaguchi, Musashino (JP); Kenya Suzuki, Musashino (JP); Takashi Go, Musashino (JP); Osamu Moriwaki, Musashino (JP); Ai Yanagihara, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/253,449

(22) PCT Filed: Jun. 19, 2019

(86) PCT No.: PCT/JP2019/024394
§ 371 (c)(1),
(2) Date: Dec. 17, 2020

(87) PCT Pub. No.: WO2020/008887
PCT Pub. Date: Jan. 9, 2020

(65) Prior Publication Data
US 2021/0258663 A1    Aug. 19, 2021

(30) Foreign Application Priority Data

Jul. 4, 2018    (JP) .............................. JP2018-127753

(51) Int. Cl.
*H04J 14/00*    (2006.01)
*H04Q 11/00*    (2006.01)
*G02F 1/01*    (2006.01)

(52) U.S. Cl.
CPC ....... *H04Q 11/0005* (2013.01); *G02F 1/0147* (2013.01); *G02F 2203/50* (2013.01); *H04Q 2011/0045* (2013.01)

(58) Field of Classification Search
CPC ........ H04Q 11/0005; H04Q 2011/0045; G02F 1/0147; G02F 2203/50; G02F 1/025; G02F 1/225
See application file for complete search history.

(56) References Cited

U.S. PATENT DOCUMENTS

| | | | |
|---|---|---|---|
| 2013/0272700 A1* | 10/2013 | Satoh | H04B 10/516 398/45 |
| 2014/0126905 A1 | 5/2014 | Yonenaga et al. | |
| 2016/0013868 A1* | 1/2016 | Anderson | G02F 1/015 359/246 |

FOREIGN PATENT DOCUMENTS

| | | |
|---|---|---|
| JP | H05-17672 U | 3/1993 |
| JP | H10-308961 | 11/1998 |

(Continued)

OTHER PUBLICATIONS

Himeno et al., *Silica-based low loss and high extinction ratio 8×8 thermooptic matrix switch with path-independent loss arrangement using double Mach-Zehnder interferometer switching units*; NTT Opto-Electronic Laboratories; 22$^{nd}$ Conference on Optical Communication 1996.

(Continued)

*Primary Examiner* — David G Payne
*Assistant Examiner* — Pranesh K Barua
(74) *Attorney, Agent, or Firm* — Workman Nydegger

(57) ABSTRACT

An optical signal processing device is described herein for reducing electric wirings in an optical switch or an optical filter realized using an optical waveguide. The optical signal processing device includes an optical waveguide formed on a substrate. In the optical signal processing device, the (Continued)

optical waveguide includes at least one input port and at least one output port, a plurality of driven elements are provided including a phase shifter that produces a phase shift to an optical signal from the input port, each of the driven elements includes at least two control terminals, control wirings are provided to have control signals being time-division synchronized applied between the two control terminals, and the control wiring for accessing the driven element is shared by the plurality of driven elements.

2 Claims, 14 Drawing Sheets

(56) References Cited

FOREIGN PATENT DOCUMENTS

| JP | 2007-316397 A | | 12/2007 |
|----|----|----|----|
| JP | 2010079082 A | * | 4/2010 |
| JP | 2012-22184 A | | 2/2012 |
| JP | 2012022184 A | * | 2/2012 |
| WO | 2013/012015 A1 | | 1/2013 |

OTHER PUBLICATIONS

T. Shibata et al., *Silica-Based Waveguide-Type 16×16 Optical Switch Module Incorporating Driving Circuits*, IEEE Photonics Technology Letters, vol. 15, No. 9, Sep. 2003, pp. 1300-1302.

Takashi Goh et al., *Low Loss and High Extinction Ratio Strictly Nonblocking 16×16 Thermooptic Matrix Switch on 6-in Wafer Using Silica-Based Planar Lightwave Circuit Technology*, Journal of Lightwave Technology, vol. 19, No. 3, Mar. 2001, pp. 371-379.

Toshio Watanabe et al., *Silica-based PLC Transponder Aggregators for Colorless, Directionless, and Contentionless ROADM*, OFC/NFOEC Technical Digest, 2012, pp. 1-3.

Kei Watanabe et al., *Ultralow Power Consumption Silica-Based PLC-VOA/Switches*, Journal of Lightwave Technology, vol. 26, No. 14, Jul. 2008, pp. 2235-2244.

* cited by examiner

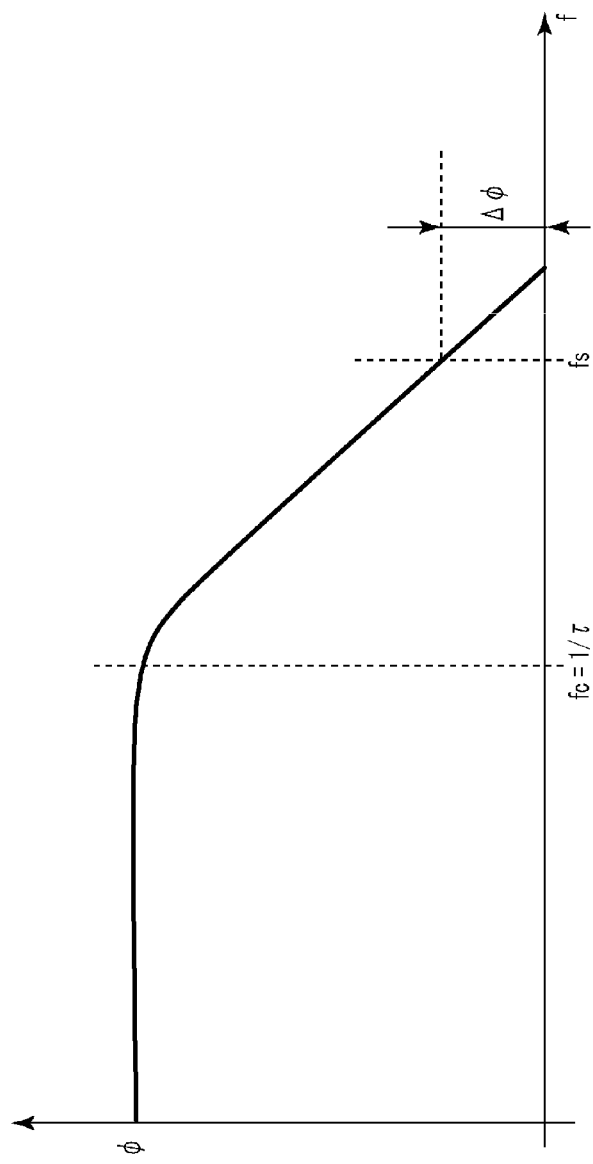

OPTICAL SIGNAL PROCESSING DEVICE AND METHOD FOR CONTROLLING SAME

TECHNICAL FIELD

The present invention relates to an optical signal processing device including an optical waveguide, and more particularly to an optical signal processing device and a method of controlling the same capable of applying an electric control signal from the outside to change a state thereof.

BACKGROUND ART

An optical waveguide is used in various optical devices for expressing various functions by confining and controlling light in a minute region. The optical waveguide is generally made of various dielectric materials, for example, silica glass materials, polymers, or lithium niobate and semiconductor materials, for example, silicon (Si) and indium phosphide (InP).

Devices using the optical waveguide technique include an optical switch and a variable optical attenuator that use a thermo-optical effect (change in refractive index due to temperature). For example, it has been reported in the case of the optical switch that a plurality of Mach-Zehnder interferometers (MZIs) (see Non-Patent Literature 1) including a phase shifter using a thermo-optical effect are combined and arranged in series and in parallel to realize a multi-input and multi-output switch (see Non-Patent Literatures 2 and 3). In such an optical switch, phase shifters of the respective MZIs are driven with an electric signal to change a phase by the thermo-optical effect, and thereby an output destination of a large number of input light can be switched.

In addition, a variable optical attenuator (VOA, see Non-Patent Literature 4) has also been reported. For example, a plurality of MZIs are integrated with phase shifters, and thus the variable optical attenuator can also be arrayed.

Various optical devices using the optical waveguide described above are indispensable for the configuration of an optical communication system, and in particular, are becoming increasingly important in optical communication nodes having a CDC (Colorless, Directionless, Contentionless)-ROADM (Reconfigurable Optical Add/Drop Multiplexing) function in recent years. For example, a multicast switch (MCS) is an optical device indispensable for realizing the CDC-ROADM function. A device such as MCS changes a switch state of an optical signal with an electric signal by a phase shifter using a thermo-optical effect, but as the scale of a ROADM device, that is, an optical node increases, the number of phase shifters involved increases.

For example, in an MCS having a scale of 16×16, the number of switch elements is at least 256 or more. In order to obtain a high extinction ratio in an off state of the optical signal, one switch element (driven element) is preferably configured by two MZIs, and the number of phase shifters is 512.

CITATION LIST

Non-Patent Literature

Patent Literature 1: T. Shibata et al., "Silica-Based Waveguide-Type 16×16 Optical Switch Module Incorporating Driving Circuits", in IEEE Photonics Technology Letters, vol. 15, no. 9, pp. 1300-1302, September 2003.
Non-Patent Literature 2: Takashi Goh, Mitsuho Yasu, Kuninori Hattori, Akira Himeno, Masayuki Okuno, and Yasuji Ohmori, "Low Loss and High Extinction Ratio Strictly Nonblocking 16×16 Thermooptic Matrix Switch on 6-in Wafer Using Silica-Based Planar Lightwave Circuit Technology", IEEE J. Lightwave Technol., vol. 19, no. 3, pp. 371-379, 2001
Non-Patent Literature 3: T. Watanabe, et. al., "Silica-based PLC Transponder Aggregators for Colorless, Directionless, and Contentionless ROADM", OFC/NFOEC2012, OTh3D. 1, Mar. 8, 2012, Los Angeles
Non-Patent Literature 4: Kei Watanabe, Yasuaki Hashizume, Yusuke Nasu, Masaki Kohtoku, Mikitaka Itoh, and Yasuyuki Inoue, "Ultralow Power Consumption Silica-Based PLC-VOA/Switches", J. Lightwave Technol. 26, 2235-2244 (2008)

SUMMARY OF THE INVENTION

Technical Problem

In the above-described MCS, it is necessary to apply an electric control signal to the phase shifters of the respective MZIs in order to drive 512 MZIs. In a conventional optical switch device such as an MCS, electric wirings are formed on a chip from each of phase shifters to a chip end and are wire-bonded to a printed board (wire bonding board) from the chip end via bonding pads, and thus the access of the electric control signal to the respective phase shifters is performed. However, the conventional method has problems that the area occupied by the electric wirings and the bonding pads on the chip is increased, as a result, a chip size is increased. The area of the electric wirings becomes remarkably larger as the device scale increases. For example, even in the case of the conventional MCS chip of about 16×16 shown in FIG. 1, half of the chip area may be the area occupied by 512 electric wirings 100 and electric pads 200 for control (from FIG. 3 of Non-Patent Literature 2).

The present invention has been made in view of such problems. An object is to provide an optical signal processing device including an optical waveguide formed on a chip substrate, in which electric wirings for accessing a driven element such as a phase shifter in a chip are constructed in at least a two-dimensional matrix in an equivalent circuit manner to reduce the number of electric pads for wire bonding required to connect to a control circuit and to simplify the electric wirings.

Means for Solving the Problem

The present invention has the following configurations in order to achieve such an object.

In other words, the present invention is to provide an optical signal processing device including an optical waveguide formed on a substrate, wherein the optical waveguide includes at least one input port and at least one output port, a plurality of driven elements are provided including a phase shifter that produces a phase shift to an optical signal from the input port, and each of the driven elements is an optical waveguide-type optical device including a phase shifter having at least two control terminals, the plurality of driven elements are disposed in a row and column (array, matrix) as an equivalent circuit, row wirings are provided to electrically connect terminals on one side of the respective driven elements existing in the same row to each other, column wirings are provided to electrically connect terminals on the other side of the respective driven elements existing in the same column to each other, and at least one of the row wirings and the column wirings is driven or controlled by an electric driving unit.

Further, as a control method of driving a plurality of driven elements, there is a control method of individually controlling the driven elements in such a manner that there are as many electric driving units as the number of columns, each of the electric driving units is column-driven in a time-division manner, and a row control signal is applied to each of the row wirings in synchronization with the column driving state. With such a method, the optical signal processing device is controlled in a time-division manner with column driving signals and row control signals. Here, the column driving signals and the row control signal can be collectively referred to as control signals, and the row wirings and the column wirings can also be referred to as control wirings.

Note that although an expression of rows and columns, an array, or a matrix is general as an expression of an array, the number of dimensions of the array is not limited to two dimensions. The order of notation of each dimension can be replaced, that is, for example, it is clear that an equivalent configuration can be realized even when the rows are exchanged with the columns in the two dimensions.

In the following description, a configuration of a two-dimensional array of rows and columns on a chip (substrate) plane will be mainly described as an example, but in the present invention, for example, a plurality of chips are integrated and mounted, so that an optical signal processing device having a three-dimensional array can also be configured. Further, a plurality of optical signal processing devices having such a three-dimensional array can be arrayed as a unit to form a multi-dimensional array of three or more dimensions. The expressions such as rows and columns in the following description should be understood not only for the two-dimensional array but also for a two-dimensional sub-array in the configuration of the multi-dimensional array of three or more dimensions.

The driven element is not limited to the switching element, and may be an element having at least two independent control signal inputs (terminals, pads) and a phase shifter. Furthermore, the driven element do not necessarily have to be physically arranged in a row and column, an array, or a matrix, and the present invention is applicable as long as the driven element can be accessed in at least two or more independent directions in such an array in terms of an equivalent circuit.

Examples of configurations of an embodiment of the present invention are as follows.
(Configuration 1)
An optical waveguide formed on a substrate, the optical waveguide including at least one input port and at least one output port; and
  a plurality of driven elements including a phase shifter,
    the phase shifter producing a phase shift to an optical signal from the input port,
    each of the driven elements including
      at least two control terminals, and
      control wirings provided to have control signals applied between the two control terminals, the control signals being time-division synchronized,
    wherein the control wiring for accessing the driven element is shared by the plurality of driven elements.
(Configuration 2)
The optical signal processing device according to configuration 1, wherein
  the plurality of driven elements are disposed in a matrix as an equivalent circuit, and
  the control wirings includes a row control wiring corresponding to a row of the matrix and a column driving wiring corresponding to a column of the matrix, and the two control terminals are connected to the row control wiring and the column driving wiring for the driven element existing at an intersection of the row and the column.
(Configuration 3)
The optical signal processing device according to configuration 2, comprising:
  a control signal generation unit being connected to each of the row control wirings and each of the column driving wirings and for generating the control signals, the control signals being time-division synchronized and selectively addressing the row control wirings and the column driving wirings connected to at least one desired driven element.
(Configuration 4)
The optical signal processing device according to any one of configurations 1 to 3, further comprising:
  a rectification unit being connected in series with each of the driven elements.
(Configuration 5)
The optical signal processing device according to any one of configurations 1 to 4, wherein the optical signal processing device is a matrix switch, a multicast switch, an optical filter, or an optical signal attenuator array.
(Configuration 6)
A method of controlling the optical signal processing device according to any one of configurations 1 to 5, wherein
  the control signal is a time division control signal having a time waveform being time-division synchronized in a predetermined time slot, the time waveform being repeated in a predetermined pattern over a plurality of switching cycles T, the switching cycle T including a plurality of time slots.
(Configuration 7)
The method of controlling the optical signal processing device according to configuration 6, wherein the switching cycle T of the time division control signal is sufficiently shorter than a time constant $\tau$ of the phase shifter.
(Configuration 8)
The method of controlling the optical signal processing device according to configuration 6 or 7, wherein
  a modulation format of the optical signal is a quadrature amplitude modulation signal, and
  a relation $\psi<\theta$ is established, wherein $\theta$ is defined as a phase difference corresponding to a distance between respective symbol points of the quadrature amplitude modulation signal and $\psi$ is defined as a residual fluctuation component at a switching frequency $fs(=1/T)$ of the time division control signal in a frequency response of the phase shifter.

Effects of the Invention

According to the present invention, it is possible to reduce electric wirings in an optical signal processing device such as an optical switch or an optical filter realized using an optical waveguide and to reduce a chip size. In addition, the driving unit such as a power source conventionally installed for each individual driven element is shared in a unit such as a row or a column by time-dividing a plurality of driven elements at different timings, and thus the number of driving units can be reduced. With the above effects, the chip size of the optical signal processing device is reduced, mass productivity is improved, and the number of parts is reduced, which contributes to cost reduction of the device.

BRIEF DESCRIPTION OF DRAWINGS

FIG. 17 is a frequency characteristic diagram showing a relation between a phase modulation amount and a time-division drive frequency of a phase modulation element to explain Example 5 of the present invention.

DESCRIPTION OF EMBODIMENTS

An embodiment of the present invention will be described in detail below with reference to the drawings.

Example 1

Figure 2:
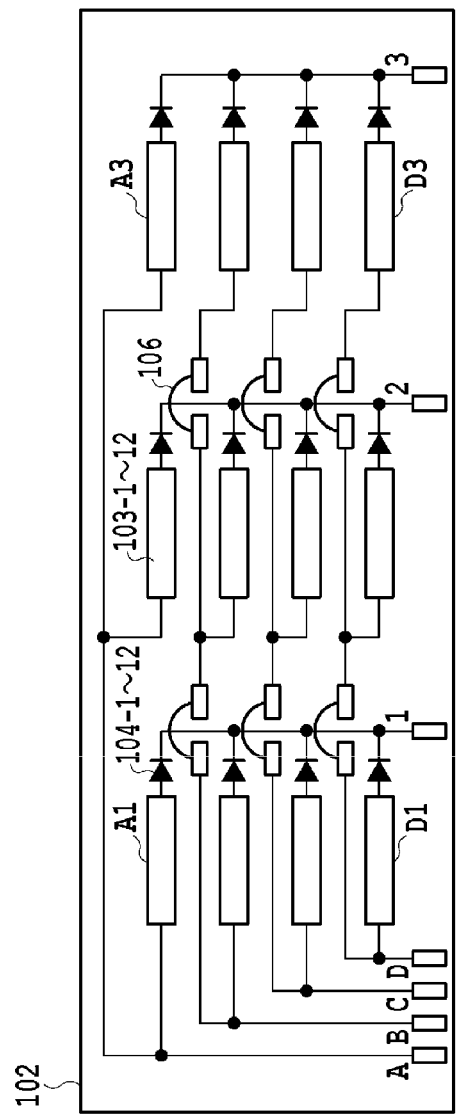
FIG. 2 is a chip plan view showing an electric circuit configuration of an optical signal processing device of Example 1 of the present invention.

FIG. 2 is a chip plan view showing an electric circuit configuration of an optical signal processing device of Example 1 of the present invention. The optical signal processing device shown in FIG. 2 is, for example, an optical signal processing device with three optical inputs and four optical outputs, and an optical waveguide chip 102 formed on a substrate includes 12 phase shifters 103-1 to 103-12 configured to change a phase of an optical signal passing through an optical waveguide (not shown) and 12 diodes 104-1 to 104-12 corresponding to the respective phase shifters, the phase shifters and the diodes being disposed in an array configuration of 4 rows and 3 columns as shown in the drawing and being connected to each other by electric wirings.

In FIG. 2, four row control signals are supplied to four electric wiring pads (terminals) A, B, C, and D for row control signals provided at a lower left side from a control unit (not shown). The four wirings for row control signals are respectively branched into two in a row direction at respective row positions of a first column at a left end, one of the branched wirings is connected to the first column phase shifter to control the first column phase shifter, and then is line-concentrated on an electric wiring pad (terminal) 1 for column driving through the first column diode.

In the first column at the left end, the other wiring branched into two for the four row control signals directly reaches a branch point in a central second column in a first row and reaches the branch point through the wire bonding wiring 106 in rows other than the first row. The wirings for the four row control signals at the branch point in the second column are further branched into two in the row direction at each row position.

One of the wirings for the four row control signals branched into two in the central second column is connected to the phase shifter in the second column to control the phase shifter, and then passes through the diode in the second column to be line-concentrated on the electric wiring pad (terminal) 2 for the column driving.

Similarly, in the second column, the other wiring branched into two for the four row control signals directly reaches a third column in the first row at a right end and reaches the third column at the right end through the wire bonding wiring 106 in rows other than the first row. The wirings for the four row control signals are connected to the phase shifter in the third column to control the phase shifter, and then pass through the diode in the third column to be line-concentrated on the electric wiring pad (terminal) 3 for the column driving.

The three electric wiring pads (terminals) 1 to 3 for column driving, on which the four row control signals (A to D) are line-concentrated, are synchronized with the row control signal by a column driving signal from a column driving unit (not shown) and are driven in a time-division manner, respectively.

With such a configuration, a control wiring for the row control signal and the column driving signal for accessing a driven element including the phase shifter is shared by a plurality of driven elements, and the optical signal processing device can be controlled by the column driving signal and the row control signal in a time division manner.

(Structure of Phase Shifter)

Figure 3:
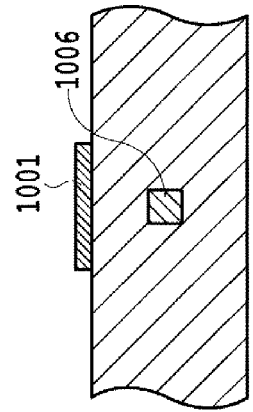
FIG. 3 is a chip cross-sectional view of phase shifters of the optical signal processing device shown in FIG. 2.

FIG. 3 shows a chip cross-sectional view of the phase shifters 103-1 to 103-12 in a plane orthogonal to the optical waveguide. The phase shifter forming the driven element includes a heater 1001 and an optical waveguide 1006 disposed immediately below the heater. When a control signal is applied to both ends of the heater 1001 of the phase shifter, the heater 1001 generates heat, a thermo-optical effect is generated in the optical waveguide 1006 disposed immediately below, and thus the phase of the optical signal passing through the relevant portion of the optical waveguide 1006 is phase-shift modulated.

The optical waveguide 1006 is formed of, for example, a silica optical waveguide, a polymer waveguide, or silicon. Although a buried waveguide structure is described as an example in FIG. 3, a rib-type waveguide structure or a diffusion-type waveguide structure may be used, for example.

Figure 4:
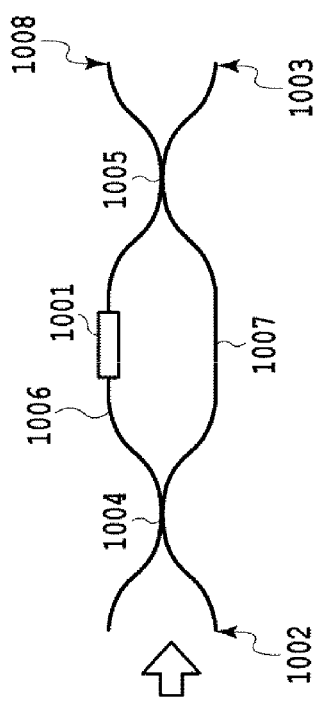
FIG. 4 is a plan view of an MZI including the phase shifters in FIG. 3.

FIG. 4 is a plan view of an MZI (Mach-Zehnder interferometer) as an example of the driven element including the phase shifter of FIG. 3. The phase shifter of FIG. 3 is provided in an arm optical waveguide 1006 of the MZI shown in FIG. 4. In other words, the MZI shown in FIG. 4 is disposed as a driven element at each of the phase shifters 103-1 to 103-12 shown in FIG. 2.

In the MZI, an optical signal input from an input optical waveguide 1002 is branched into two arm optical waveguides 1006 and 1007 by a directional coupler 1004. A heater 1001 is installed above the one arm optical waveguide 1006 as shown in FIG. 3, and a phase of the optical signal passing through the arm optical waveguide 1006 is phase-shift modulated by a thermo-optical effect generated when a control signal is applied. The optical signals passed through the arm optical waveguides 1006 and 1007 are then multiplexed by the directional coupler 1005, and are distributed and output to an output optical waveguide 1003 or 1008 of the MZI according to a difference in phase between the two multiplexed optical signals.

Using the MZI including such a phase shifter, an optical element having a function of an optical switch and an optical attenuator, for example can be configured to be used as the driven element of the optical signal processing device of the present invention.

(Address of Phase Shifter)

In the example of the present invention shown in FIG. 2 and subsequent drawings, the phase shifters 103-1 to 103-12 selectively accessed by row control signals (hereinafter, referred to as symbols A to D which are the same as the terminal names of the row electrode pad) and column driving signals (similarly, indicated by the terminal names 1 to 3 of the column electrode pad) are disposed and addressed in rows and columns, the rows are represented by alphabets, and the columns are represented by numbers. The display order of the rows and the columns is arbitrary, but for example, the phase shifters 103-1 to 103-12 correspond to addresses A1 to A3, B1 to B3, C1 to C3, and D1 to D3 in the row direction priority order, respectively. In the drawings, only the addresses A1, A3, D1, and D3 of the phase shifters at four corners are illustrated for simplification.

Electrodes (on an input side of the heater in FIG. 2) on one side of the phase shifters existing in the same row is connected by a horizontal row, and electrodes (on a cathode side of the diode in FIG. 2) on the other side are connected to each other by a vertical column wiring. In this configuration, the phase shifters are arranged in four rows and three columns.

In FIG. 2, an intersection of the row wiring and the column wiring is realized by straddling with the wire bonding 106, but may be realized using another method. For example, the wirings may intersect with each other by forming the electric wirings on the optical waveguide in multiple layers.

(Driving of Phase Shifter)

In the optical signal processing device shown in FIG. 2, for example, a high potential is supplied to the row wiring pad A and a low potential is supplied to the column wiring pad 1, so that a potential difference is generated and thus power is supplied to the phase shifter (A1) located in the leftmost column and the topmost row. Similarly, a potential difference is generated between the row wiring pad D and the column wiring pad 3, so that power is supplied to the phase shifter (D3) located in the rightmost column and the bottommost row.

Since the plurality of phase shifters are electrically connected to each other, when power is supplied to the phase shifters, a current may sneak around an unintended phase shifter, and thus there is a problem that the power is supplied. In order to prevent such a problem, the diodes 104-1 to 104-12 are attached in series to the electric wirings to the respective phase shifters, so that it is possible to prevent sneak current and prevent power source to the unintended phase shifter. The diode may be an element having electric rectification characteristics or a rectification unit, and a pn junction or a Schottky barrier diode can be used. In an optical waveguide such as a silicon waveguide or an InP waveguide made of a semiconductor material, a pn junction may be formed in the optical waveguide to provide rectification characteristics.

(Number of Electric Pads and Number of Wirings)

When the electric wirings are performed as described above, the number of electric pads taken out from the chip including the optical waveguide is reduced to 7 in Example 1 compared with the number of phase shifters being 12. This is because the wirings are shared by rows and columns and the number of wirings is the sum of the number of rows and the number of columns in the present invention. In the conventional configuration, assuming that the number of electrode pads is equal to the number of heaters (the number of rows×the number of columns), a greater effect can be obtained when more phase shifters are used.

In further another numerical example, when 20 phase shifters exist in the row direction and 5 phase shifters exist in the column direction, 100 wirings (=20×5) are required in the conventional wiring method, whereas, in the present invention, the number of wirings becomes 25 (=20+5) as a result of sharing the control wirings and a remarkable wiring reduction effect can be obtained.

Further, it is preferable to set a row and column so that the number of rows and the number of columns are the same as much as possible in terms of minimizing the number of wirings. When the number of phase shifters to be controlled is defined as K, the number of row wirings is defined as M, and the number of column wirings is defined as N, the following relation is satisfied:

$$K = M \times N$$

The minimum value of the number of wirings (M+N) is realized when M=N, and the number of wirings at this time is $2 \times K^{1/2}$. For example, when the number of phase shifters is 256, there is M=N=16, and the number of wirings is smallest and the wiring area reduction effect can be obtained when the number of wirings is 32 in total including the number of row wirings and the number of column wirings.

Example 2

Figure 5:
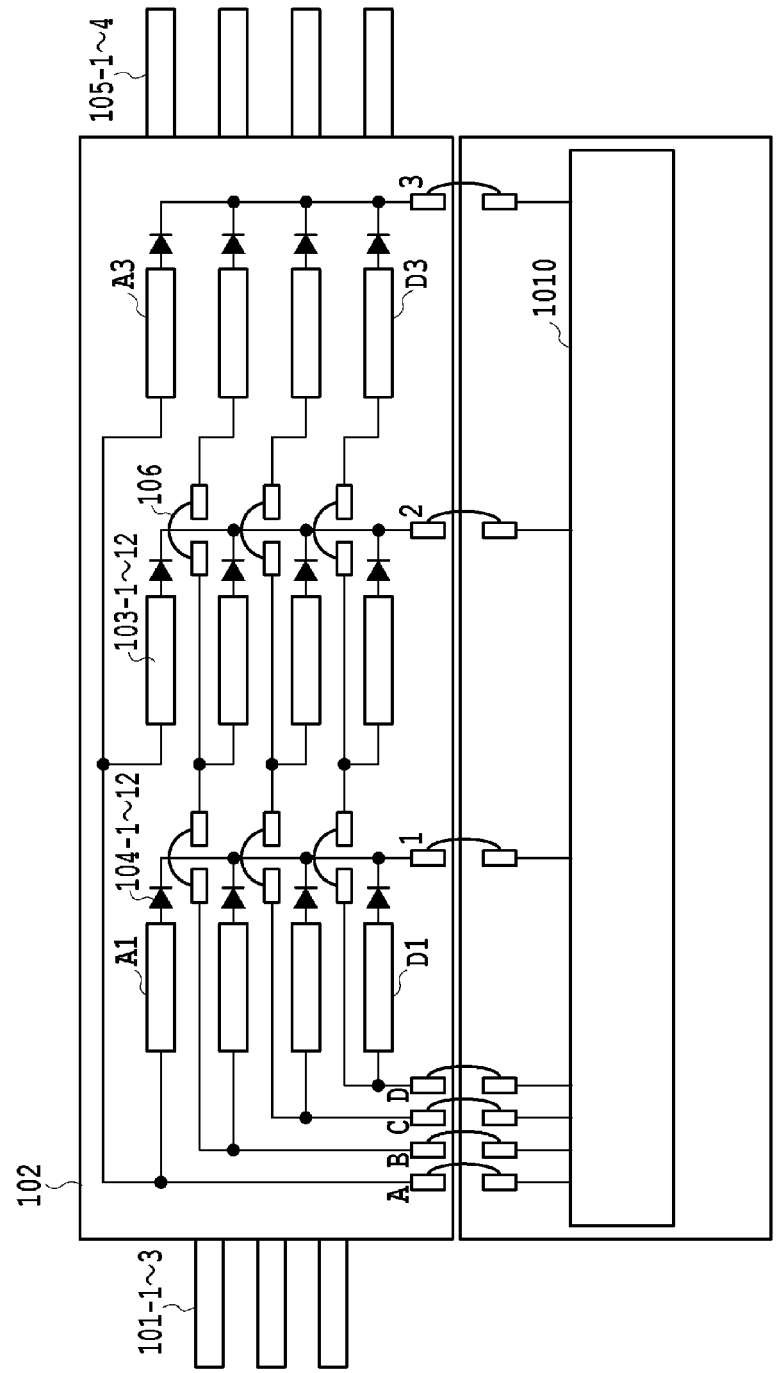
FIG. 5 is a plan view showing a configuration of an optical signal processing device of Example 2 of the present invention.

FIG. 5 is a plan view showing an optical switch configured as an optical signal processing device of Example 2 of the present invention. As shown in FIG. 5, a chip 102 of the optical switch is connected to a control signal generation unit 1010 that generates row control signals (A to D) and column driving signals (1 to 3). The control signal generation unit 1010 gives the row control signals (A to D) and the column driving signals (1 to 3) as time-divisionally synchronized control signals to at least one of row wiring electric pads A to D and at least one of column electric pads 1 to 3 so as to address the phase shifter to be controlled.

FIG. 5 also shows three input fibers 101-1 to 101-3 for providing input optical signals of the optical switch and four output fibers 105-1 to 105-4 for providing output optical signals of the optical switch. An optical input end and an optical output end of each of the fibers constitute an input port and an output port of the optical waveguide formed on the substrate of the optical waveguide chip 102. In Example 2 shown in FIG. 5, other parts are the same as those of Example 1 shown in FIG. 2, and will not be described.

(Time of Control Signal)

Figure 6:
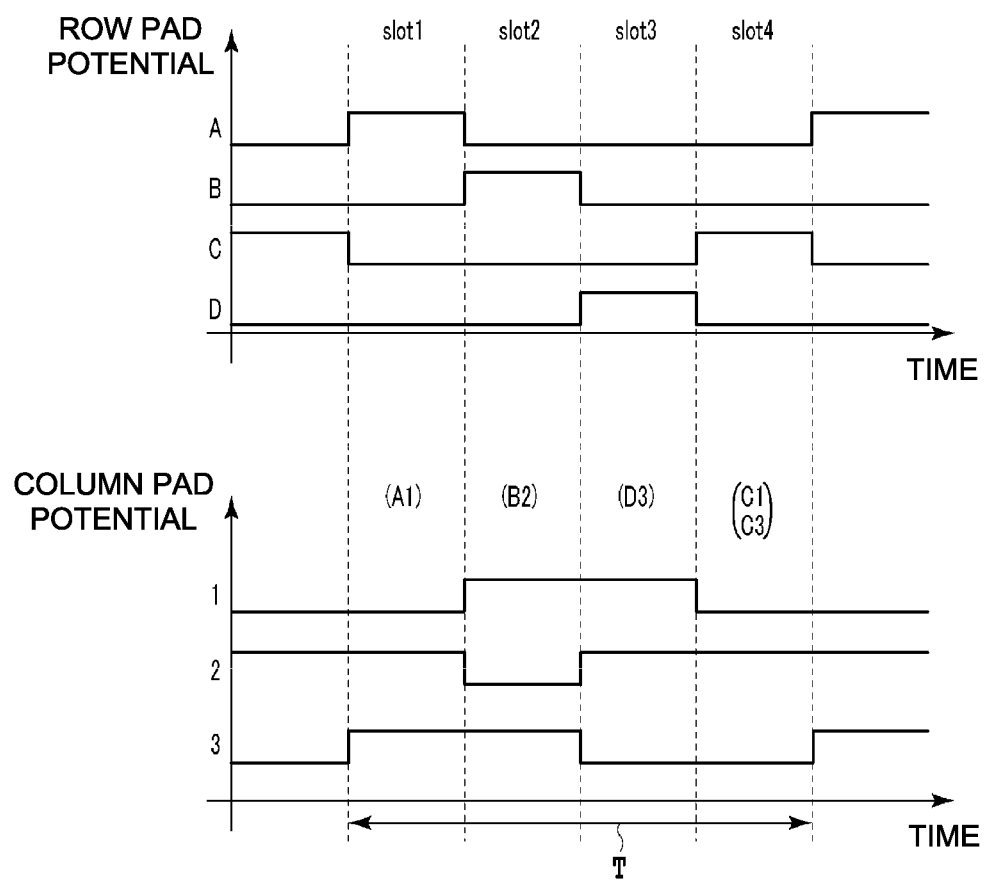
FIG. 6 is a waveform diagram illustrating control signals of the optical signal processing device of Example 2.

FIG. 6 is a waveform diagram of control signals output from the control signal generation unit 1010, and illustrates a method of controlling the optical signal processing device (optical switch) of Example 2. In FIG. 6, symbols A to D indicate potentials of the row electrode pads, and symbols 1 to 3 indicate potentials of the column electrode pads.

In FIG. 6, an example is illustrated in which a time on a time axis (horizontal axis) indicates that a switching cycle T sufficiently shorter than a thermal time constant τ of the phase shifter is further divided into four time slots (slot1 to slot4) and time division control signals, which change levels of the time waveforms of the plurality of control signals in synchronization between a high potential and a low potential, is used. As is clear from a conducting direction of the diodes in FIG. 5, the row control signals (A to D) are significant signals (positive logics) at high potential, and the column driving signals (1 to 3) are significant signals (negative logics) at low potential. FIG. 6 shows addresses (A1, B2, D3, and (C1, C3)) of the phase shifters selected in the respective time slots (slot1 to slot4).

In slot1, a high potential is applied only to the electric pad A among the row wirings, and a low potential is applied only to the electric pad 1 among the column wirings. Therefore, in slot1, a potential difference is applied only to the phase shifter A1 and the phase shifter A1 is addressed.

In slot2, a high potential is applied only to the electric pad B among the row wirings, and a low potential is applied only to the electric pad 2 among the column wirings. Therefore, in slot2, a potential difference is applied only to the phase shifter B2, and the phase shifter B2 is addressed.

In slot3, a high potential is applied only to the electric pad D among the row wirings, and a low potential is applied only to the electric pad 3 among the column wirings. Therefore, in slot3, a potential difference is applied only to the phase shifter D3, and the phase shifter D3 is addressed.

In slot4, a high potential is applied only to the electric pad C among the row wirings, and a low potential is applied only to the electric pads 1 and 3 among the column wirings. Therefore, in slot4, a potential difference is applied to the phase shifters C1 and C3, and the phase shifters C1 and C3 are addressed.

In such a time waveform, the time division control signal in which the row control signals (A to D) and the column driving signals (1 to 3) are synchronized in the time slot is repeatedly applied to the electrode pad of on the chip 102 of the optical signal processing device in units of the time waveform of the switching cycle T including the plurality of time slots, and thus each of the phase shifters are controlled.

As described above, it is possible to individually control any of the phase shifters by periodically applying the control signal to the phase shifter to be controlled in time division synchronization. Here, a cycle in which each of the phase shifters is addressed (switching cycle T) is set to be sufficiently shorter (T<τ) than the time constant τ of the phase shifter.

For example, since the time constant of the thermo-optical phase shifter in the silica-based optical waveguide is about several ms, a switching frequency (fs=1/T) is set to several tens of kHz to several hundreds of kHz. Since the phase shift given to the optical signal by the phase shifter acts thermo-optically, the phase shifter acts with a time constant on the heat generated by the heater. Since a time constant of a thermal change of the phase shifter is sufficiently longer than a time constant of the electric signal, the phase shift given to the optical signal by the phase shifter does not respond within a time of one time slot or the switching cycle T of the control signal. However, when the time waveform is repeated in a predetermined pattern over a plurality of switching cycles T, only DC components (effective values) of the time waveform of the control signal are integrated in a so-called PWM (pulse width modulation) manner to perform the thermo-optical action, and then the address-selected phase shifter performs the phase shift.

In the above description, the predetermined pattern in which the control signal is repeated over the plurality of switching cycles T may be a pattern in which the time waveform of the control signal in each of the switching cycles T is repeated with the same time waveform each time in each of the switching cycles T as shown in drawings, or may be a pattern in which the time waveform of the control signal is repeated with different time waveforms. The pattern repeated with different time waveforms can be generated, for example, by changing the order of the time slots cyclically or randomly at every switching cycle T.

Even in this case, the cycle of the pattern is preferably shorter than the time constant of the phase shifter, and it is preferable that the same set of phase shifters be driven by the same number of times in the cycle of the pattern.

By the control in this way, it is possible to freely control the phase shifts of all the arranged phase shifters within the range of the time constant of thermal change using a limited number of electric wirings. Simply switching the control signal after waiting until the selected phase shifter causes a thermal response to cause a phase change would result in not only simply delaying switching of the control signal, but would also cause a thermal response (temperature decrease) in other phase shifters in which an address is not selected during the delay time, thereby causing a phase change, so that all the phase shifters could not be freely controlled.

In addition, a single phase shifter can also be selected and addressed in a specific time slot like slot1 to slot3, or a plurality of phase shifters in the same row or column can also be simultaneously selected and addressed like slot4. It is also possible to increase or decrease the number of time slots included in the switching cycle T according to the number of phase shifters to be controlled.

Example 3

Figure 7:
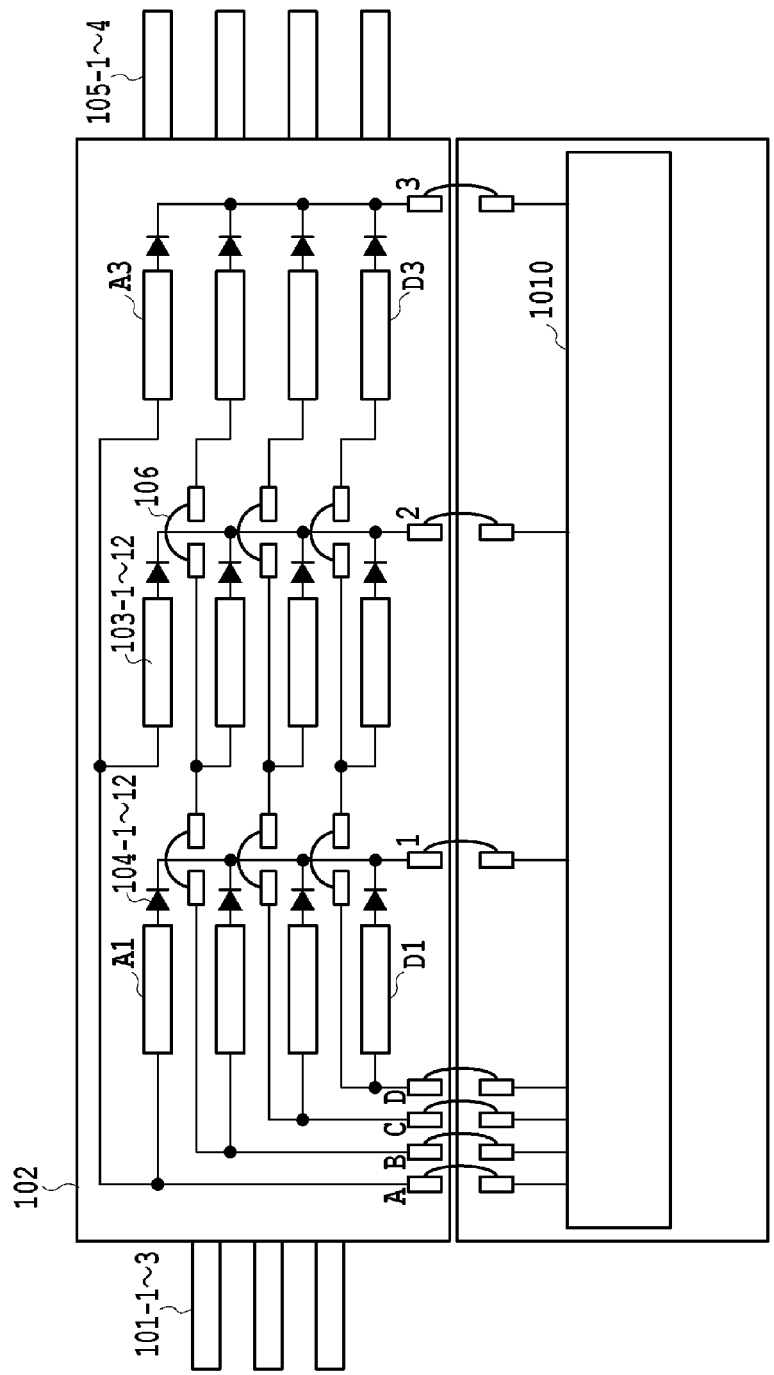
FIG. 7 is a plan view showing a configuration of an optical signal processing device of Example 3 of the present invention.

FIG. 7 is a plan view showing a configuration of an optical signal processing device (optical switch) of Example 3 of the present invention. The optical signal processing device of Example 3 is an optical signal processing device with three optical inputs and four optical outputs similar to that of Example 2 (FIG. 5), and an optical switch chip 102 formed on a substrate includes 12 phase shifters 103-1 to 103-12 and 12 diodes 104-1 to 104-12 corresponding to the respective phase shifters, the phase shifters and the diodes being disposed in an array configuration of 4 rows and 3 columns and being connected to each other by electric wirings.

The chip 102 of the optical signal processing device is connected to a control signal generation unit 1010 that generates column driving signals (1 to 3) and row control signals (A to D), and operates as an optical switch that controls optical signals input from three input fibers 101-1 to 101-3 to be switched to four output fibers 105-1 to 105-4.

Figure 1:
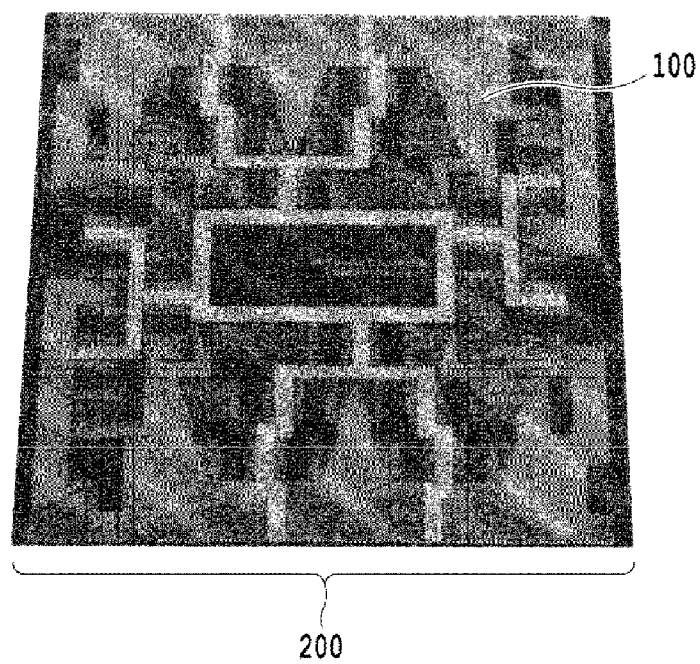
FIG. 1 is a photograph of a plan view showing a state in which electric wirings and electric pads of a conventional chip are used.

Generally, a multi-input and multi-output optical switch using an optical waveguide is realized in such a manner that a plurality of MZIs are connected as shown in FIG. 1 of Non-Patent Literature 2, for example. In the switch of FIG. 7, from which output fiber 105 the signal light input from an input optical fiber 101 is to be output is selected according to which phase shifter 103 is driven. Since the switch of Example 3 is a switch with three inputs and four outputs, there are 12 (3×4) types of switch states for 1:1 connection between input and output. In order to set 12 states independently, 12 degrees of freedom are required, and it is necessary to control 12 phase shifters independently.

(Control Method and Waveform Example of Control Signal)

Figure 8:
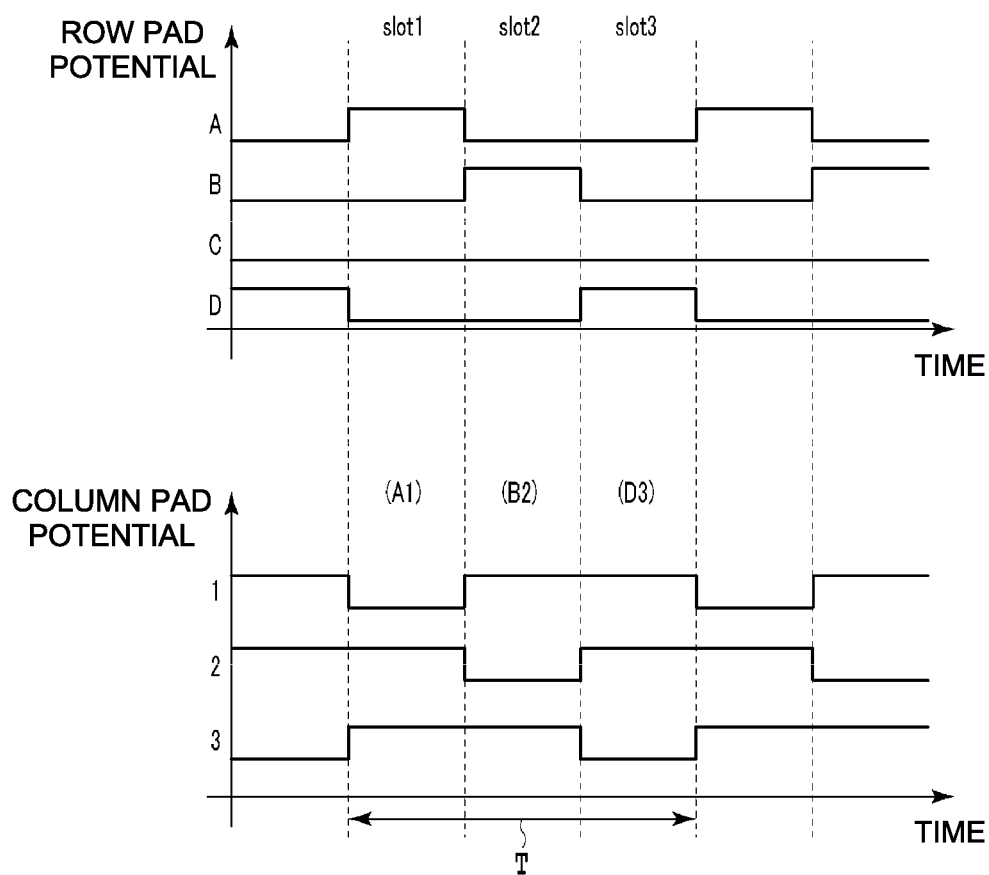
FIG. 8 is a waveform diagram illustrating an example of control signals of the optical signal processing device of Example 3.
Figure 9:
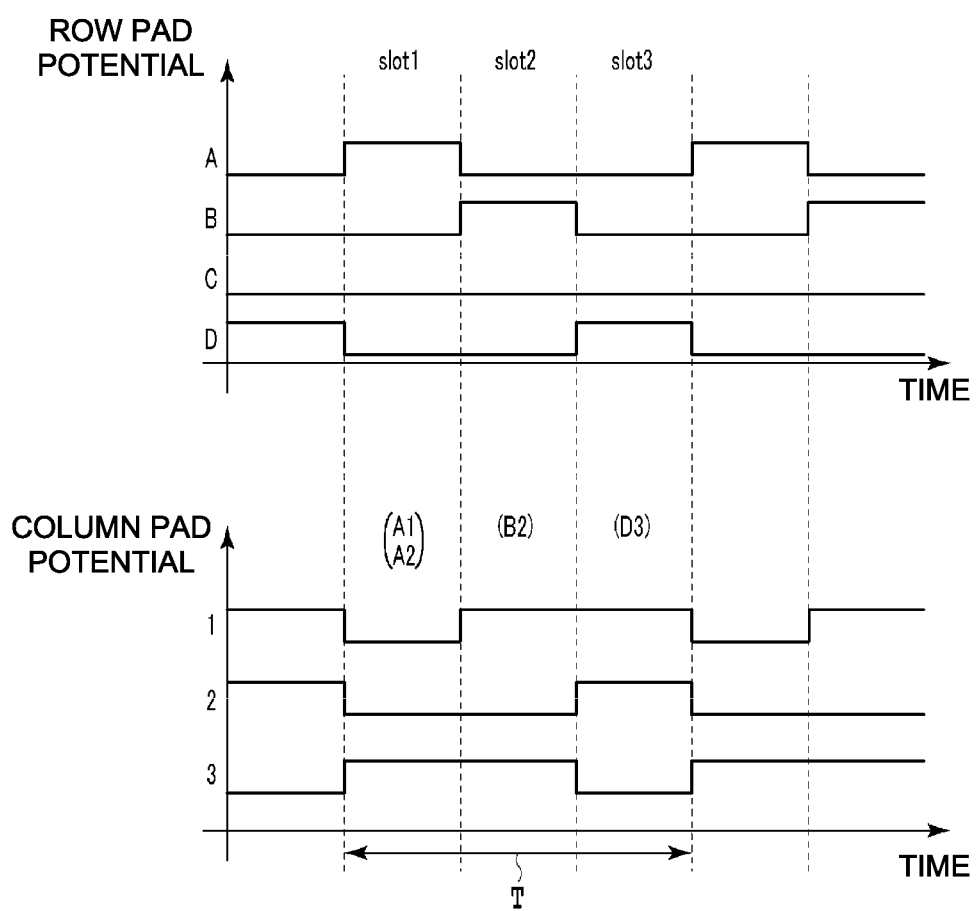
FIG. 9 is a waveform diagram illustrating another example of control signals of the optical signal processing device of Example 3.
Figure 10:
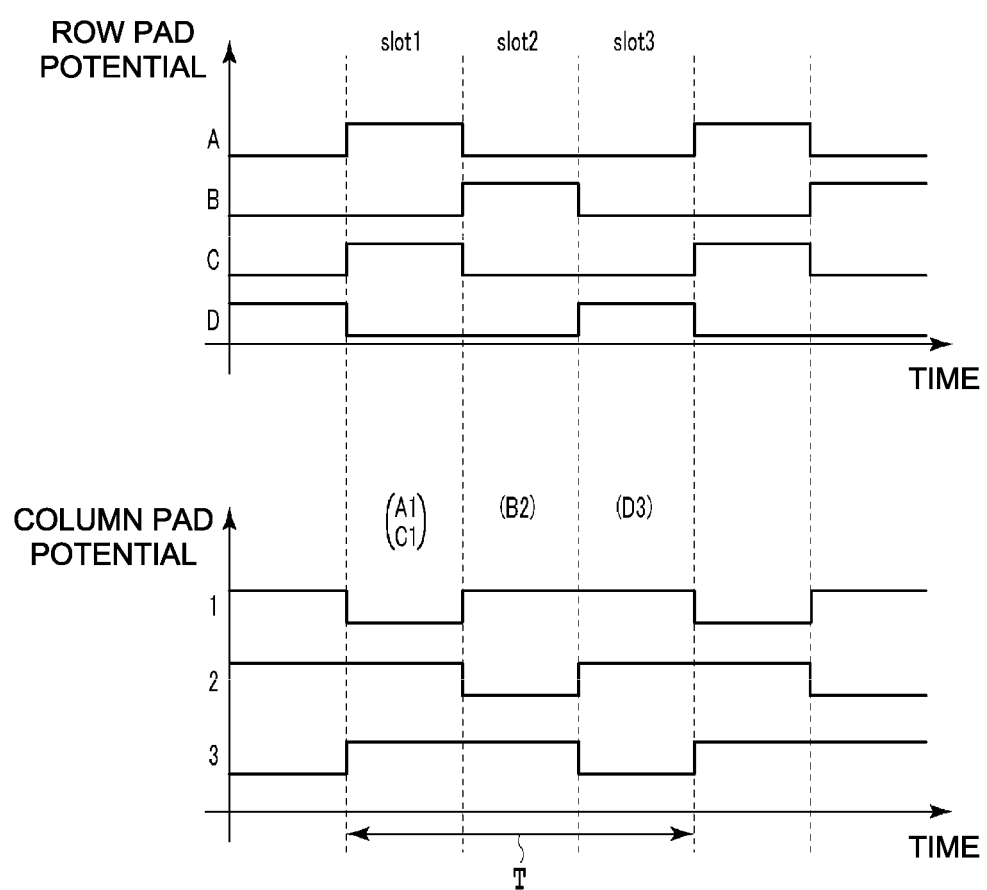
FIG. 10 is a waveform diagram illustrating further another example of control signals of the optical signal processing device of Example 3.

FIG. 8 to FIG. 10 illustrate waveform diagrams of control signals for explaining an operation of the control signal generation unit 1010 as a method of controlling the optical signal processing device of Example 3.

A structure of Example 3 shown in FIG. 7 is the same as that of Example 2 (FIG. 5), and thus electric wirings for accessing the respective phase shifters 103 are connected to the control signal generation unit 1010 via the row electric pads A to D and the column electric pads 1 to 3.

With the above-described configuration, for example, the phase shifter (A1) located in the topmost row and the leftmost column in FIG. 7 is supplied with power by generating a potential difference between the row electric pad A and the column electric pad 1, and the phase shifter (D3) located in the bottom row and the rightmost column is supplied with power by generating a potential difference between the row electric pad D and the column electric pad 3. The control signal generation unit 1010 generates and transmits a control signal that generates such a potential difference.

The control signal generation unit 1010 may be of any type as long as it can provide signals (for example, potential difference and power) to each electrode in a time division manner. For example, using an arbitrary waveform generator without being limited a binary pulse waveform as shown in FIG. 6, the control signal generation unit 1010 may generate a signal having a potential that arbitrarily changes with time and transmit the signal. Further, GPIO pins such as FPGAs, CPUs, or DSPs may be directly connected to the electrode pads A to D and 1 to 3.

At this time, power is sequentially supplied to the phase shifter, which needs to be driven, in a time-division manner. For example, as shown in FIG. 8, a constant switching cycle T is divided into three time slots, an operation can also be performed such that power is supplied to different phase shifters by time-division synchronization control of the control signal generation unit 1010 in each of the divided time slots. FIG. 8 shows an example of pad potential waveforms of the control signal generated by the control signal generation unit 1010 when driving three phase shifters A1, B2, and D3. As in Example 2, the time waveform of the control signal may be repeated in the same or different predetermined patterns over a plurality of switching cycles T.

(Frequency Characteristics of Phase Modulation Amount and Switching Frequency)

The switching cycle T of the control signal of the phase shifter generated by the control signal generation unit 1010 is set to a time sufficiently shorter than the time constant $\tau$ of the thermal response in which the phase shifter reacts. In other words, the switching frequency fs of the control signal is set to a frequency sufficiently higher than the frequency (cutoff frequency fc) corresponding to the time constant $\tau$ of the thermal response in which the phase shifter reacts.

Figure 11:
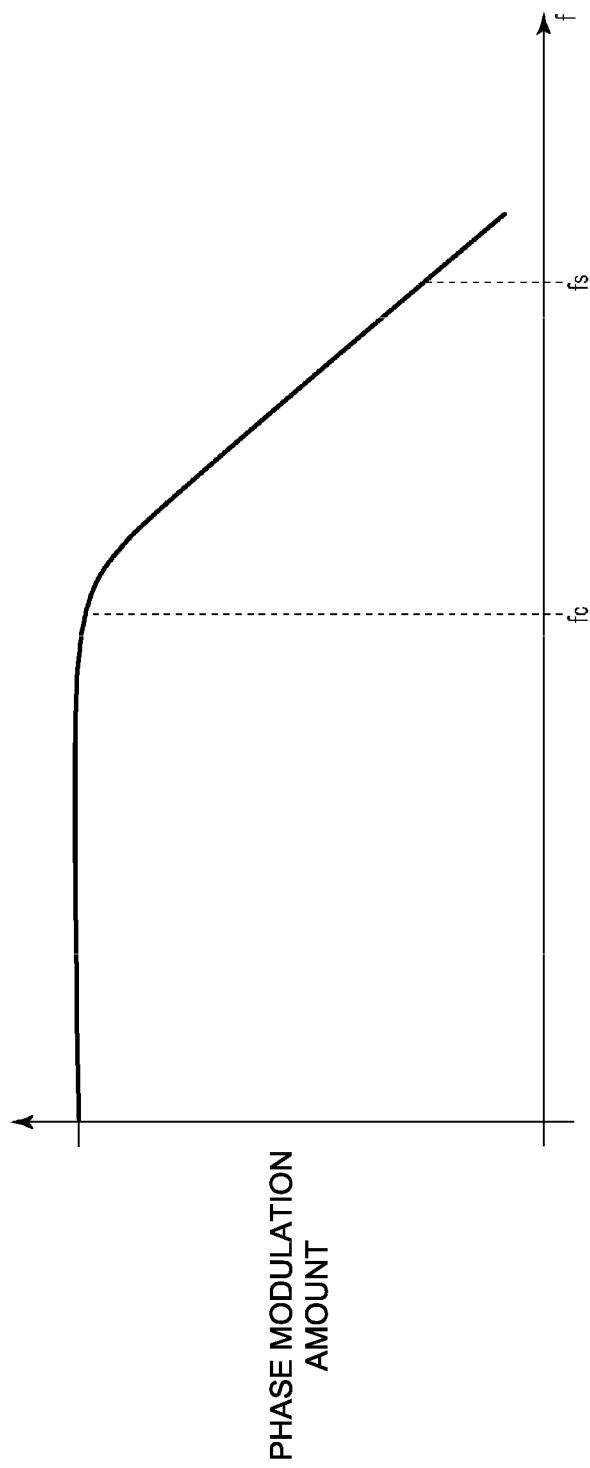
FIG. 11 is a frequency characteristic diagram showing a change in a phase modulation amount of a phase shifter with respect to a switching frequency.

FIG. 11 is a frequency characteristic diagram showing a change in the phase modulation amount of the phase shifter with respect to the switching frequency f. In a case of a slow switching frequency f (f<fc: cutoff frequency), the response of the phase shifter follows during one cycle, but during such a cycle, phases of other phase shifters simultaneously controlled by time division is changed. For this reason, the plurality of phase shifters controlled by time division can be simultaneously supplied with power and can be driven, respectively, when switching is performed at a high frequency so that the phase of the phase shifter does not change (fc<fs=1/T).

In performing the time-division control, the control becomes easier (the switching frequency may be lower) when the response time of the driven element is slower (in FIG. 11, the phase modulation amount is attenuated at a higher frequency). The driven element using the thermo-optical effect has a relatively slow response time and is therefore easy to control.

In addition to the phase shifter using the thermo-optical effect, a polarization modulation element based on a magneto-optical effect and an optical modulation element based on an electro-optical effect that shows a high-speed response are also equipped with capacitors for each driven element to make the response time equivalently long, whereby the effect of the present invention can be obtained.

(Rectification Unit)

In addition, since the plurality of phase shifters are electrically connected to each other, when power is supplied to the phase shifters, a current may sneak around an unintended phase shifter, and thus there is a problem that the power is supplied. In order to prevent such a problem, diodes are provided, as a rectification unit, in series with the respective phase shifters. For example, in a case where there is no diode in FIG. 7, when a high potential is applied to the electric pad A and a low potential is applied to the electric pad 1 at the time of driving the phase shifter A1, a current flows in the order of electric pad A→phase shifter A2→phase shifter B2→phase shifter B1→electric pad 1 which is a path of the access wiring, and an unexpected phase shifter may also be driven.

In order to prevent such problems, the diodes are attached to the electric wirings (wirings of the column driving signals 1 to 3) on the output sides of the respective phase shifters, so that it is possible to prevent sneak current and prevent power supply to an unintended phase shifter. The diodes may be provided in the electric wiring (wiring for the row control signals A to D) on the input sides of the respective phase shifters, or may be provided in a reverse direction if the level of the control signal is inverted. The diode may be an element having rectification characteristics, and a pn junction or a Schottky barrier diode can be used. Preferably, a switching diode having a short reverse recovery time is used. Further, in a case of a semiconductor optical waveguide made of silicon or InP, a pn junction can be formed in the optical waveguide to provide rectification characteristics.

Further, it is possible to simultaneously drive a plurality of phase shifters in the same row or column in the same slot.

(Other Examples of Waveform Diagram of Control Signal)

FIGS. 9 and 10 show other examples of waveform diagrams of the control signal generated by the control signal generation unit 1010 during the time division control in which the switching cycle T is divided into three time slots. In FIG. 9, a potential difference is applied to the phase shifters A1 and A2 in the same row A in slot1, to the phase shifter B2 in slot2, and to the phase shifter D3 in slot3. On the other hand, in FIG. 10, a potential difference is applied to the phase shifters A1 and C1 in the same column 1 in slot1, to the phase shifter B2 in slot2, and to the phase shifter D3 in slot3.

Examples shown in FIGS. 9 and 10 are examples in which all of a plurality of phase shifters are driven at the same timing in slot1, but may be driven in slot2 or slot3. In other words, it is possible to simultaneously drive a plurality of phase shifters existing in the same row or the same column in a single slot and to control the optical switch by controlling the potentials of a plurality of wirings in each of the row wirings or in each of the column wirings in a single slot.

Further, one switch element may be driven by one phase shifter, or one switch element may be driven using a plurality of phase shifters. In this case, it is also possible to reduce the number of time division slots by simultaneously driving the phase shifters used to drive one switch element. As in Example 2, the time waveform of the control signal may be repeated in the same or different predetermined patterns over a plurality of switching cycles T.

Examples of the optical signal processing device capable of being controlled include a matrix switch using a plurality of phase shifters, a multicast switch, a lattice filter, a transversal filter, and a variable optical attenuator array.

Example 4

In the optical signal processing device of the present invention, the wirings to the phase shifters are configured by a row and column (matrix) of row wirings and column wirings, so that each of the phase shifters can be controlled by taking out a small number of electric wirings. The electric wirings may be logically arranged in a matrix as an equivalent circuit without being physically arranged in rows and columns.

Figure 12:
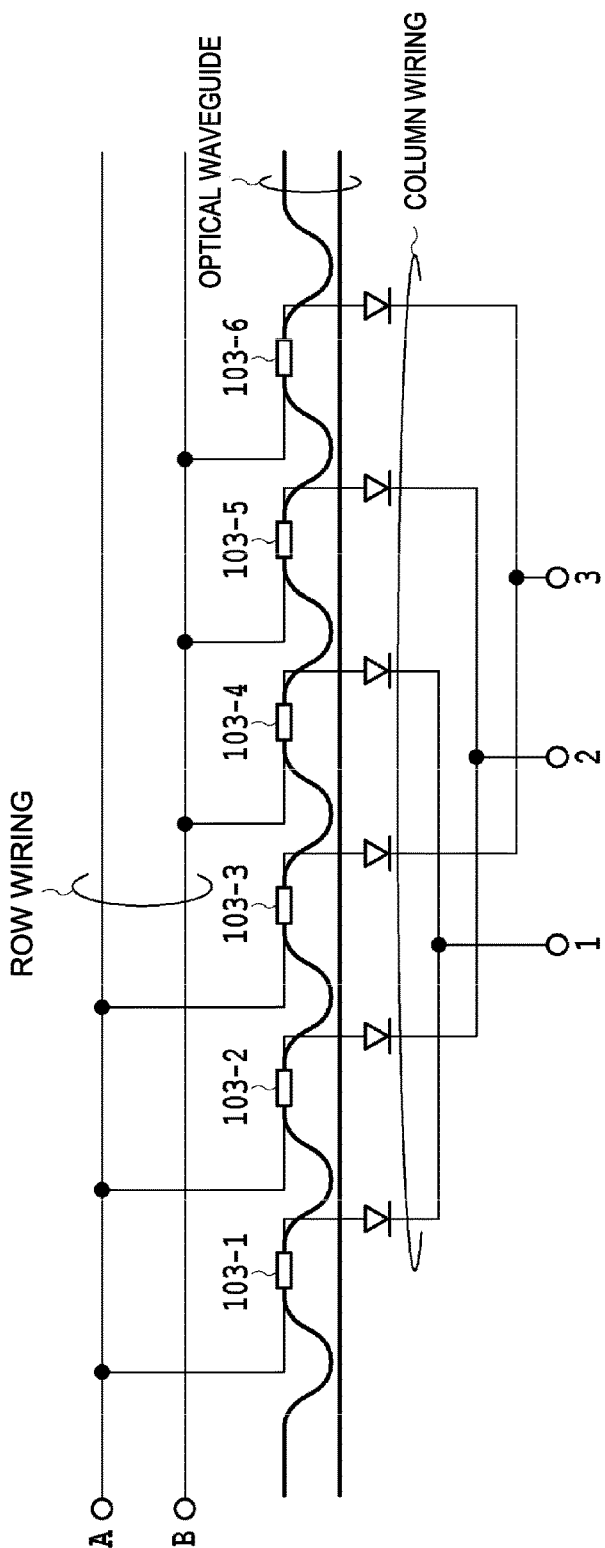
FIG. 12(a) is a diagram showing a physical circuit configuration example of a lattice filter of Example 4 of the present invention.
FIG. 12(b) is a diagram showing an electric equivalent circuit in FIG. 12(a).
Figure 12:
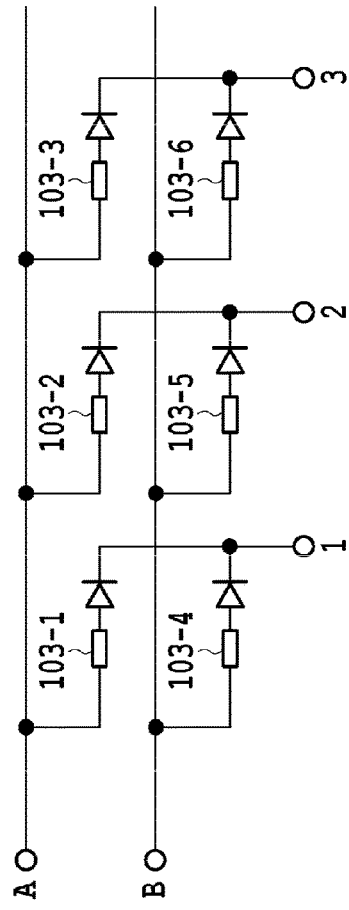

FIG. 12(a) is a diagram showing a physical circuit configuration example of a lattice filter of Example 4 of the present invention, and FIG. 12(b) is a diagram showing an electric equivalent circuit of FIG. 12(a). FIG. 12(a) shows a physical layout of an actual optical waveguide and phase shifters 103-1 to 103-6 on the optical waveguide substrate and electric wirings (row wirings A and B and column wirings 1 to 3) for controlling the phase shifters. FIG. 12(a) also shows a diode as a rectification unit.

Due to the characteristics of the optical waveguide, it is difficult to physically provide extreme bending in the optical waveguide. However, since there are few restrictions on the layout of the electric wirings, a plurality of phase shifters are often laid out in a straight line as shown in FIG. 12(a). Even in this case, as shown in the electric equivalent circuit of FIG. 12(b) in which the electric circuit portion is converted in an equivalent circuit, it can be logically treated as a matrix in which the phase shifters are disposed.

Although the lattice filter has been described as an example in Example 4, the present invention is also applicable to a transversal filter, a filter using a ring resonator, a variable optical attenuator array using MZI, and an optical signal processing device obtained by combining these components. Further, the present invention is also applicable to the optical switches according to Examples 1 to 4.

Figure 13:
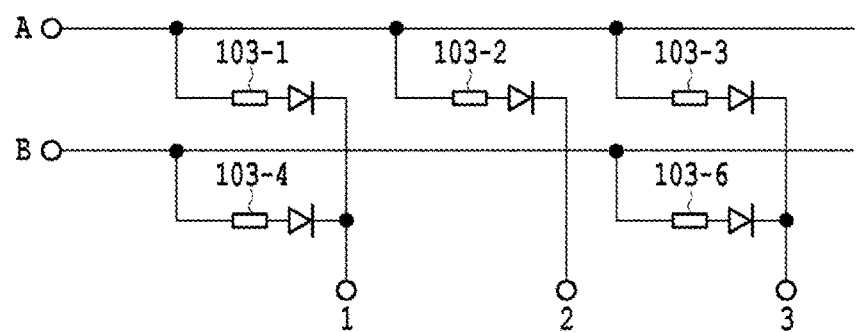
FIG. 13 is a diagram showing an example in which a phase shifter is not disposed at an intersection in Example 4 of the present invention.

Further, as shown in FIG. 13, driven elements such as phase shifters may not necessarily exist at intersections of row wirings and column wirings. FIG. 13 shows an example in which a phase shifter 103-5 is not disposed at an intersection of a row wiring B and a column wiring 2. In the wirings in rows and columns described above, it is obvious that access wiring is two-dimensionally expanded, and it is clear that a strict row and column configuration is not necessary. In other words, the row and column (arrangement, array and matrix) in the present invention may partially include empty elements, and a coarse (sparse) arrangement may be possible as long as the access wirings can be expanded as a whole.

Example 5

As described in Examples 1 to 4 above, it is possible to reduce the number of access wirings to the driven elements by accessing the driven elements in the time-division manner. In Example 5 of the present invention, a time-division drive frequency fs (a frequency corresponding to the switching cycle T in Examples 1 to 3) will be examined when a time-division access to the respective driven elements is performed.

In recent optical communication systems, signals are generally transmitted using a quadrature amplitude modulation (QAM) format in order to improve frequency utilization efficiency. A phase modulation element is required to generate a QAM signal, but in a case where a time-division drive frequency fs is not sufficiently high when the driven element is a phase modulation element, the phase modulation component due to the time-division drive signal of the phase modulation element may be superimposed on an optically modulated QAM signal as noise and the communication quality may be deteriorated. Therefore, the time-division drive frequency is preferably sufficiently higher than the response of the phase modulation element.

FIGS. 14 to 17 are conceptual diagrams for explaining Example 5 based on the above concept. In FIGS. 14 to 17 of Example 5, 16 QAM signals are described as an example, but it is clear that the same applies to other modulation formats such as QPSK (Quadrature Phase Shift Keying) or 64 QAMs.

Figure 14:
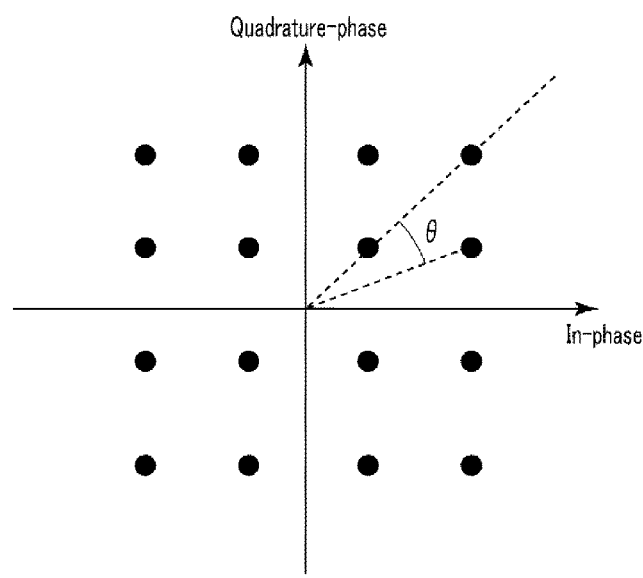
FIG. 14 is a constellation map of 16 QAM signals illustrating Example 5 of the present invention.

FIG. 14 is a constellation map of 16 QAM signals. Each of symbol points corresponds to information, and it is important that these symbol points are sufficiently separated from each other for accurate information transmission.

Figure 15:
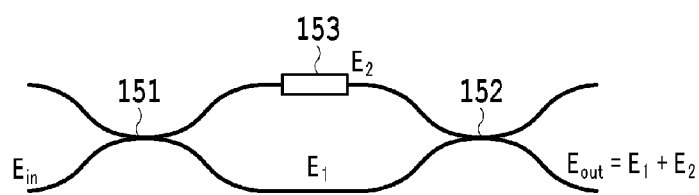
FIG. 15 is a diagram showing optical signals of respective portions of a Mach-Zehnder interferometer including a phase modulation element to explain Example 5 of the present invention.

FIG. 15 is a diagram showing optical signals of respective portions of a Mach-Zehnder interferometer including a phase modulation element 153 of the optical signal processing device described in Example 5. In the Mach-Zehnder interferometer, an input optical signal Ein is branched into two by a coupler 151, one of which being subjected to phase modulation by the phase modulation element 153 which is a phase shifter, and then being multiplexed via the coupler 152 and output as Eout. At this time, any one of two outputs to be output is determined by a phase relation between the two branched optical signals E1 and E2.

Figure 16:
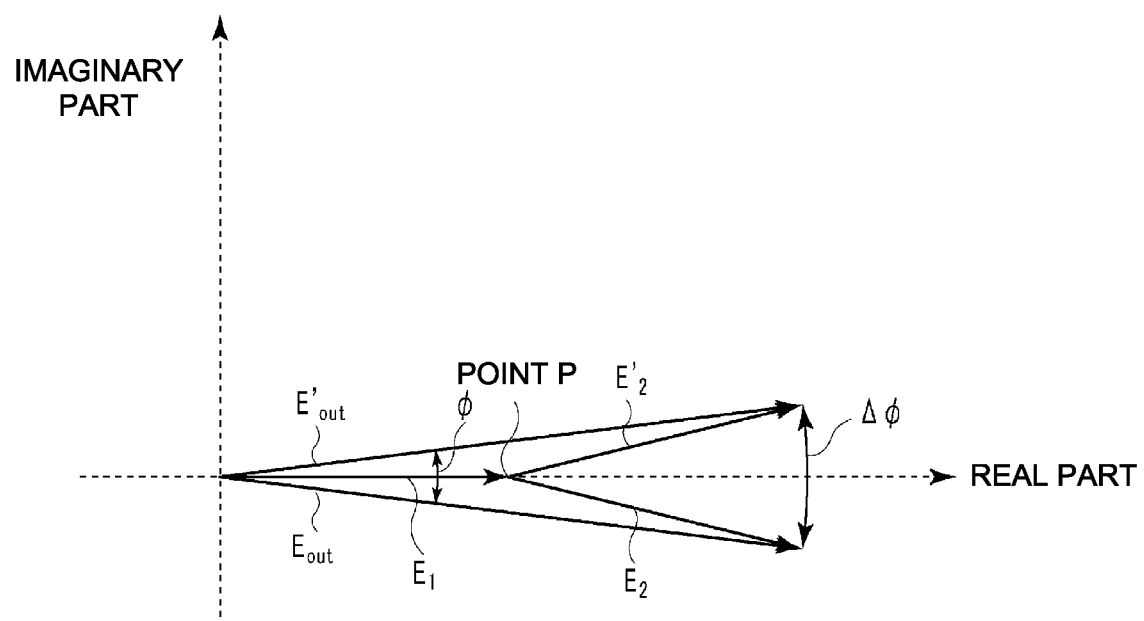
FIG. 16 is a complex signal vector diagram showing a relation of the optical signals in FIG. 15.

In a case of FIG. 15, the optical signal E2 is modulated by the phase modulation element (phase shifter) 153, but a drive frequency component remaining in E2 is added on a modulated optical signal as shown in a complex signal vector diagram of FIG. 16 when the time division drive of the present invention is used. In other words, an optical electric field Eout after a Mach-Zehnder output of the optical signal is a vector combination of the optical electric field E2 passing through the arm having the phase modulation element at an end point P on a phasor of the optical electric field E1 passing through the arm to which the phase modulation is not applied, and the optical electric field Eout is subjected to phase modulation by a residual phase component Δϕ given by the phase modulation element.

Here, the amount of the phase modulation given by the output optical signal is the phase amount shown by a superimposing phase ψ in FIG. 16. In the constellation map of the QAM signal in FIG. 14, when the phase amount ψ (residual fluctuation component) becomes larger than the phase amount θ required from symbol separation, a signal error occurs and correct information transmission can hardly be performed. Accordingly, the time-division drive frequency fs is preferably set sufficiently higher than the response frequency fc of the phase modulation element so as to satisfy a relation of ψ<θ. Preferable setting is as follows:

$$\psi < 0.1 \times \theta \tag{1}$$

FIG. 17 is a frequency characteristic diagram showing a relation between the frequency response (cutoff frequency fc corresponding to the time constant τ) of the phase modulation element, the residual phase Δϕ, and the time-division drive frequency fs.

In a case of the optical phase modulation element (phase shifter) due to the thermo-optical effect, its response is a first-order lowpass filter, and a cutoff region has attenuation characteristics of 10 dB/dec. Accordingly, in order to satisfy the relation of (1), when the thermo-optic time constant of the phase shifter is set to τ, the time division drive frequency fs satisfies the following relation with respect to the cutoff frequency of fc=1/τ:

$$fs > 10 \times 1/\tau$$

For example, in a case of a typical silica-based optical waveguide, since the thermo-optic time constant τ of the phase shifter is about 1 ms, setting f=10 kHz does not affect the QAM signal and the optical signal processing device of the present invention can be controlled.

INDUSTRIAL APPLICABILITY

As described above, according to the present invention, it is possible to reduce the electric wirings in the optical signal processing device such as the optical switch or the optical filter that is realized using the optical waveguide, and to reduce the size of the chip. In addition, the driving unit such as a power source conventionally installed for each individual phase shifter is shared with a plurality of phase shifters at different timings, and thus the number of driving units such as power sources can be reduced. With the above effects, mass productivity of the non-signal processing device is improved, and the number of parts is reduced, which contributes to cost reduction of the device.

REFERENCE SIGNS LIST

100 electric wiring
200 electric pad
102 optical waveguide chip
103-1 to 103-12 phase shifter
104-1 to 104-12 diode
A to D electric wiring pad (row control signal terminal)
1 to 3 electric wiring pad (column driving signal terminal)
106 wire bonding wiring
101-1 to 101-3 input fiber
105-1 to 105-4 output fiber
153 phase modulation element
1001 heater
1002 input optical waveguide
1003, 1008 output optical waveguide
1004, 1005, 151, 152 directional coupler (coupler)
1006, 1007 (arm) optical waveguide
1010 control signal generation unit

The invention claimed is:

1. A method of controlling an optical signal processing device, the optical signal processing device comprising:
    an optical waveguide formed on a substrate, the optical waveguide including at least one input port and at least one output port; and
    a plurality of driven elements including a phase shifter, the phase shifter producing a phase shift to an optical signal from the input port,
    each of the driven elements including
        two control terminals, and
        control wirings provided to have control signals applied between the two control terminals, the control signals being time-division synchronized, wherein any of the control wirings for accessing the driven element is shared by the plurality of driven elements,
    the method comprising:
    applying the control signals to the two control terminals, each of the control signals is a time division control signal having a time waveform being time-division synchronized in a predetermined time slot, the time waveform being repeated in a predetermined pattern over a plurality of switching cycles T, the switching cycle T including a plurality of time slots; and
    addressing any of the plurality of driven elements according to the control signals,
    wherein a modulation format of the optical signal is a quadrature amplitude modulation signal, and a relation ψ<θ is established, wherein θ is defined as a phase difference corresponding to a distance between respective symbol points of the quadrature amplitude modulation signal and ψ is defined as a residual fluctuation component at a switching frequency fs (=1/T) of the time division control signal in a frequency response of the phase shifter.

2. The method of controlling the optical signal processing device according to claim 1, wherein
    the switching cycle T of the time division control signal is shorter than a time constant τ of the phase shifter.

* * * * *